US011400438B2

(12) United States Patent
Dionysiou et al.

(10) Patent No.: US 11,400,438 B2
(45) Date of Patent: Aug. 2, 2022

(54) SYNTHESIS AND IMMOBILIZATION OF A FERROUS SULFITE CATALYST AND METHOD OF DEGRADING FLUORINATED ORGANIC CHEMICALS IN AQUEOUS MEDIA

(71) Applicant: University of Cincinnati, Cincinnati, OH (US)

(72) Inventors: Dionysios D. Dionysiou, Cincinnati, OH (US); Wael H. M. Abdelraheem, Cincinnati, OH (US); Mallikarjuna N. Nadagouda, Mason, OH (US)

(73) Assignees: University of Cincinnati, Cincinnati, OH (US); The United States of America as Represented by the Administrator of the U.S. Environmental Protection Agency, Washington, DC (US)

( * ) Notice: Subject to any disclaimer, the term of this patent is extended or adjusted under 35 U.S.C. 154(b) by 285 days.

(21) Appl. No.: 16/703,193

(22) Filed: Dec. 4, 2019

(65) Prior Publication Data

US 2020/0179909 A1    Jun. 11, 2020

Related U.S. Application Data

(60) Provisional application No. 62/775,582, filed on Dec. 5, 2018.

(51) Int. Cl.
| | | |
|---|---|---|
| B01J 27/02 | (2006.01) |
| C02F 1/70 | (2006.01) |
| C02F 101/36 | (2006.01) |
| B01J 21/18 | (2006.01) |

(52) U.S. Cl.
CPC ............... B01J 27/02 (2013.01); C02F 1/70 (2013.01); *B01J 21/18* (2013.01); *C02F 2101/36* (2013.01)

(58) Field of Classification Search
CPC ..... B01J 21/18; B01J 27/02; C02F 1/70; C02F 2101/36
USPC ....................................................... 502/222
See application file for complete search history.

(56) References Cited

U.S. PATENT DOCUMENTS 4,349,650 A * 9/1982 Krespan ................ C07C 43/225
204/296

OTHER PUBLICATIONS

Pound, J.R. (1948) Journal of Physical Chemistry, 52(6), 1103-1105.*
Bagatur, T. et al. (2018) El-Cezeri Journal of Science and Engineering, 5(3) 724-733.*
Song, Z. (2013) Journal of Hazardous Materials, 262, 332-338.*
Pound, Oxidation of Ferrous Sulfite in Air, https://doi.org/10.1021/j150462a020, 1948, 1103-05.

(Continued)

*Primary Examiner* — Brian A McCaig
(74) *Attorney, Agent, or Firm* — Dinsmore & Shohl LLP

(57) ABSTRACT

A composition includes an aqueous solution including at least one fluorinated organic compound; and a reaction product of a source of iron(II) and a source of sulfite in the presence of water and molecular hydrogen. A method of making a catalyst includes reacting a source of iron(II) and a source of sulfite in the presence of water and molecular hydrogen. The water may include less than or equal to 1 weight percent dissolved molecular oxygen. The catalyst may be used for degrading fluorinated organic chemicals in aqueous media.

16 Claims, 6 Drawing Sheets

Before

After

(56) References Cited

OTHER PUBLICATIONS

Silva-Rackov, et al., Degradation of PFOA by hydrogen peroxide and persulfate activated by iron-modified diatomite; https://dx.doi.org/10.1016/j.apcatb.2016.03.067, 2016, 192, 253-59.

Johnson, et al., The Adsorption of Perfluorooctane Sulfonate onto Sand, Clay, and Iron Oxide Surfaces; https://doi.org/10.1021/je060285g, 2007, 52, 1165-70.

Tian, et al., Complete Defluorination of Perfluorinated Compounds by Hydrated Electrons Generated from 3-Indole-acetic-acid in Organomodified Montmorillonite, https://doi.org/10.1038/srep32949, 2016, 6, 32949 (9 pages).

Naumann, et al., Laboratory-scale photoredox catalysis using hydrated electrons sustainably generated with a single green laser, https://doi.org/10.1039/c7sc03514d, 2017, 8, 7510-20.

\* cited by examiner

Before　　　　　　　　　　After

SYNTHESIS AND IMMOBILIZATION OF A FERROUS SULFITE CATALYST AND METHOD OF DEGRADING FLUORINATED ORGANIC CHEMICALS IN AQUEOUS MEDIA

CROSS-REFERENCE TO RELATED APPLICATION

This application claims priority to U.S. Provisional application Ser. No. 62/775,582, filed on Dec. 5, 2018, the entire content of which is incorporated herein by reference.

BACKGROUND

Field

The present specification generally relates to ferrous sulfite catalysts and, more particularly, to ferrous sulfite catalysts used in the degradation of fluorinated organic chemicals in aqueous media.

Technical Background

Per- and polyfluoroalkyl substances (hereinafter "PFAS") persist long after initial release into the environment. Several chemical and physical methods have been employed to immobilize, remove, or destroy PFAS in aqueous media, such as sorption using activated carbon and clay mineral media. However, most of these technologies demonstrate unacceptable treatment for PFAS, especially in full-scale implementation.

PFAS may be remediated through redox-based treatment methods (i.e., oxidative, reductive, and nucleophilic processes). However, oxidation of the carbon-carbon bonds (hereinafter "C—C bonds") in PFAS is perceived as difficult due to the shielding effect created by fluorine atoms covalently bonded to carbon atoms.

On the other hand, chemical reduction of PFAS by solvated electrons via de-fluorination has shown some initial promise. Solvated electrons may be generated under conditions requiring high energy input, including the ultraviolet irradiation of iodide or sulfite ions under anaerobic conditions. Other methods include laser-flash photolysis of ruthenium-tris-bipyridyl dication as a catalyst with ascorbate dianion as a sacrificial donor. In general, reductive decomposition of PFAS in water is performed in the presence of strong reducing agents, under conditions of high energy consumption, and/or under conditions requiring highly sophisticated techniques, all of which limit the practical application of reductive decomposition in the field.

SUMMARY

Therefore, a need exists for novel compounds and methods for reducing PFAS in aqueous solution.

According to a first aspect, a composition comprises an aqueous solution comprising at least one fluorinated organic compound; and a reaction product of a source of iron(II) and a source of sulfite in the presence of water and molecular hydrogen.

In a second aspect, a method for degrading fluorinated organic chemicals in aqueous media includes contacting the fluorinated organic chemicals with a reaction product of a source of iron(II) and a source of sulfite in the presence of water and molecular hydrogen.

In a third aspect, the reaction product is present in a concentration of from 0.25 g/l to 1 g/l.

In a fourth aspect, the reaction product is present in a concentration of from 0.4 g/l to 0.6 g/l.

In a fifth aspect, the at least one fluorinated organic compound is selected from the group consisting of perfluoro-n-butanoic acid, perfluoro-n-pentanoic acid, perfluoro-n-hexanoic acid, perfluoro-n-heptanoic acid, perfluoro-n-octanoic acid, perfluoro-n-nonanoic acid, perfluoro-n-decanoic acid, perfluoro-n-undecanoic acid, perfluoro-n-dodecanoic acid, perfluoro-n-tridecanoic acid, perfluoro-n-tetradecanoic acid, perfluoro-n-hexadecanoic acid, perfluoro-n-octadecanoic acid, potassium perfluoro-1-butanesulfonate. sodium perfluoro-1-hexanesulfonate, sodium perfluoro-1-octanesulfonate, sodium perfluoro-1-decanesulfonate, and combinations of two or more thereof.

In a sixth aspect, the at least one fluorinated organic compound comprises perfluoro-n-octanoic acid.

In a seventh aspect, the source of sulfite comprises sodium sulfite, the source of iron(II) comprises iron(II) sulfate heptahydrate, and the reaction product comprises ferrous sulfite.

In an eighth aspect, the reaction product is a catalyst, the catalyst being immobilized on a solid support.

In a ninth aspect, the solid support is selected from the group consisting of granulated activated carbon, a porous ceramic material, a porous carbon sheet, and a combination thereof.

In a tenth aspect, a method of making a catalyst includes reacting a source of iron(II) and a source of sulfite in the presence of water and molecular hydrogen. The water comprises less than or equal to 1 weight percent dissolved molecular oxygen.

In an eleventh aspect, the water comprises less than or equal to 0.25 weight percent dissolved molecular oxygen.

In a twelfth aspect, the water is essentially free of dissolved molecular oxygen.

In a thirteenth aspect, the source of sulfite of the above method comprises sodium sulfite, the source of iron(II) comprises iron(II) sulfate heptahydrate, and the catalyst comprises ferrous sulfite.

Additional features and advantages of the embodiments described herein will be set forth in the detailed description which follows, and in part will be readily apparent to those skilled in the art from that description or recognized by practicing the embodiments described herein, including the detailed description which follows, the claims, and the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter. The following detailed description of specific embodiments of the present disclosure can be best understood when read in conjunction with the following drawings, where like structure is indicated with like reference numerals and in which:

DETAILED DESCRIPTION

Figure 1:
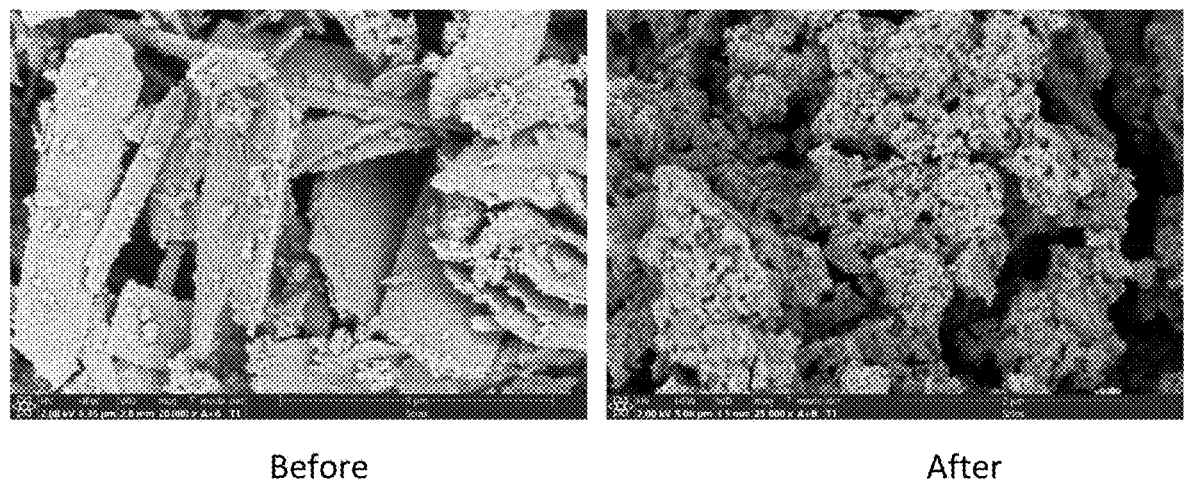
FIG. 1 shows Scanning Electron Microscopy results for the ferrous sulfite catalyst before and after use in the degradation process.

Reference will now be made to various embodiments of ferrous sulfite catalysts and the use of such ferrous sulfite catalysts in the degradation of fluorinated organic chemicals in aqueous media. According to one embodiment, a composition includes an aqueous solution comprising at least one fluorinated organic compound; and a reaction product of a source of iron(II) and a source of sulfite in the presence of water and molecular hydrogen. Various embodiments and properties thereof will be described herein with specific reference to the appended drawings.

In one or more embodiments, the aqueous solution may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the aqueous solution may comprise at least 80 wt. %, at least 90 wt. %, at least 95 wt. %, at least 99 wt. %, or even at least 99.9 wt. % of water.

In one or more embodiments, at least 90 wt. %, at least 95 wt. %, or even at least 99 wt. % of the aqueous mixture by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

In one or more embodiments, the composition described herein includes at least one fluorinated organic compound. Fluorinated organic compounds may also be referred to as PFAS. As used herein, "PFAS" and "per- and polyfluoroalkyl substances," which may be used interchangeably, refer to synthetic organofluorine compounds that have multiple fluorine atoms. In some instances, PFAS may contain only carbon atoms and fluorine atoms. In other instances, PFAS may contain carbon atoms, fluorine atoms, and hydrogen atoms, i.e. "fluorinated hydrocarbons." In other instances, PFAS may contain carbon atoms, fluorine atoms, and optionally hydrogen atoms, as well as other heteroatoms, such as sulfur, oxygen, nitrogen, and the like.

The fluorinated organic compound is not particularly limited. In embodiments, the at least one fluorinated organic compound is selected from the group consisting of perfluoro-n-butanoic acid, perfluoro-n-pentanoic acid, perfluoro-n-hexanoic acid, perfluoro-n-heptanoic acid, perfluoro-n-octanoic acid, perfluoro-n-nonanoic acid, perfluoro-n-decanoic acid, perfluoro-n-undecanoic acid, perfluoro-n-dodecanoic acid, perfluoro-n-tridecanoic acid, perfluoro-n-tetradecanoic acid, perfluoro-n-hexadecanoic acid, perfluoro-n-octadecanoic acid, potassium perfluoro-1-butanesulfonate, sodium perfluoro-1-hexanesulfonate, sodium perfluoro-1-octanesulfonate, sodium perfluoro-1-decanesulfonate, and combinations of two or more thereof.

In embodiments, the fluorinated organic compound may be present in an environmentally relevant concentration found in sources such as surface water, wastewater, ground water, and leachate waste. For instance, the fluorinated organic compound may be present in a range of from $5 \times 10^{-7}$ g/l to $2 \times 10^3$ g/l or from $10^{-6}$ g/l to $10^2$ g/l or from $10^{-5}$ g/l to 10 g/l or from $10^{-4}$ g/l to 0.1 g/l or from 0.001 g/l to 0.01 g/l. It should be understood that the concentration of fluorinated organic compound in the compositions may be within a range formed from any one of the lower bounds for the fluorinated organic compound and any one of the upper bounds of the fluorinated organic compound described herein. In other embodiments, the concentration of fluorinated organic compound may be much higher than the ranges set forth herein when present in conjunction with elevated concentrations of the ferrous sulfite catalyst.

In embodiments, the composition disclosed herein includes a reaction product of a source of iron(II) and a source of sulfite in the presence of water and molecular hydrogen. As used herein, the term "ferrous sulfite catalyst" refers to this reaction product. The ferrous sulfite catalyst may comprise, consist essentially of, or consist of ferrous sulfite, which is also referred to as "iron(II)sulfite."

In embodiments, the source of sulfite may comprise any salt or compound that results in the presence or formation of sulfite group in the synthesis solution. For instance, the source of sulfite may comprise lithium sulfite, sodium sulfite, potassium sulfite, ammonium sulfite, sodium bisulfate, magnesium sulfite, sulfurous acid (sulfur dioxide in water), or a mixture of two or more of these. In embodiments, the source of iron(II) may comprise any salt or compound that results in the presence or formation of Fe(II) in the synthesis solution. For instance, the source of iron(II) may comprise iron sulfate, iron nitrate, iron chloride, iron acetate, iron sulfide, iron ammonium sulfate, lithium iron phosphate, iron iodide, iron bromide, iron phosphide, the hydrated form of all previous salts, or a mixture of two or more of these.

The composition may include the ferrous sulfite catalyst in a concentration of from 0.25 g/l to 1 g/l. For instance, the composition may include from 0.4 g/l to 0.6 g/l ferrous sulfite catalyst. It should be understood that the concentration of ferrous sulfite catalyst in the compositions may be within a range formed from any one of the lower bounds for the ferrous sulfite catalyst and any one of the upper bounds of the ferrous sulfite catalyst described herein.

The ferrous sulfite catalyst may be dissolved in the aqueous solution. In other embodiments, the ferrous sulfite catalyst may be immobilized on a solid support. For instance, the ferrous sulfite catalyst may be immobilized on one or more of granulated activated carbon, a porous ceramic material, a porous carbon sheet, and/or a combination thereof.

In embodiments, a method of making a ferrous sulfite catalyst includes reacting a source of iron(II) and a source of sulfite in the presence of water and molecular hydrogen.

In embodiments, the water comprises less than or equal to 1 weight percent dissolved molecular oxygen. In embodiments, the water may comprise less than or equal to 0.75 weight percent dissolved molecular oxygen. In embodiments, the water may comprise less than or equal to 0.5 weight percent dissolved molecular oxygen. In embodiments, the water may comprise less than or equal to 0.25 weight percent dissolved molecular oxygen. In embodiments, the water may be substantially free of dissolved molecular oxygen. As used herein, "substantially free of dissolved molecular oxygen" refers to amounts of dissolved molecular oxygen less than or equal to 100 parts per million (ppm) by weight of the water.

In embodiments, a method of degrading fluorinated organic chemicals includes contacting the fluorinated organic chemicals with a reaction product of a source of iron(II) and a source of sulfite in the presence of water and molecular hydrogen.

EXAMPLES

The embodiments described herein will be further clarified by the following examples.

Synthesis of the Ferrous Sulfite Catalyst

Ferrous sulfate heptahydrate ($FeSO_4 \cdot 7H_2O$), sodium sulfite ($NaSO_3$), hydrochloric acid (HCl), and zinc metal (Zn) were purchased from Sigma Aldrich, St. Louis, Mo. Milli-Q water, having a resistivity of 18.2 MΩ•cm at 25° C., was used for all aqueous solution preparations. Oxygen-free water was prepared by passing $H_2$ gas through Milli-Q water for 30 minutes in a conical flask. The $H_2$ gas was generated by mixing pellets of Zn metal with HCl in a flask with an outlet tube connected to the conical flask containing the Milli-Q water through a delivery tube.

5 g iron(II)sulfate heptahydrate ($FeSO_4 \cdot 7H_2O$) were dissolved in 200 ml oxygen-free water and stirred while passing $H_2$ gas into the solution. When the $FeSO_4 \cdot 7H_2O$ was completely dissolved, a 50 ml solution of 3.4 g $NaSO_4$ in water was added dropwise to the $FeSO_4 \cdot 7H_2O$ solution via a burette at a rate of 15 drops per minute while vigorously stirring the solution. As the $NaSO_4$ solution was added, particles with a color ranging from creamy-brown to greenish-brown began to appear in the solution. The stirring was stopped, and the suspension was allowed to settle for 24 hours.

Upon settling, the precipitate was separated from the supernatant by decantation. The separated precipitate was then washed with ethyl alcohol and centrifuged at 6000 rpm. Again, the resulting precipitate was separated from the supernatant and then washed with oxygen-free water. The solid thus obtained, the ferrous sulfite catalyst, was dried under vacuum for 12 h and then stored in a sealed amber vial.

Characterization of the Ferrous Sulfite Catalyst

Physical and morphological analyses were performed on the ferrous sulfite catalyst before and after use including surface Scanning Electron Microscopy (SEM), X-ray Diffraction (XRD), and X-ray fluorescence (XPS). SEM results show the as-prepared the ferrous sulfite catalyst in the form of flakes that transform into sponge-like, porous material after use in the degradation of PFAS, as shown in FIG. 1.

Figure 2:
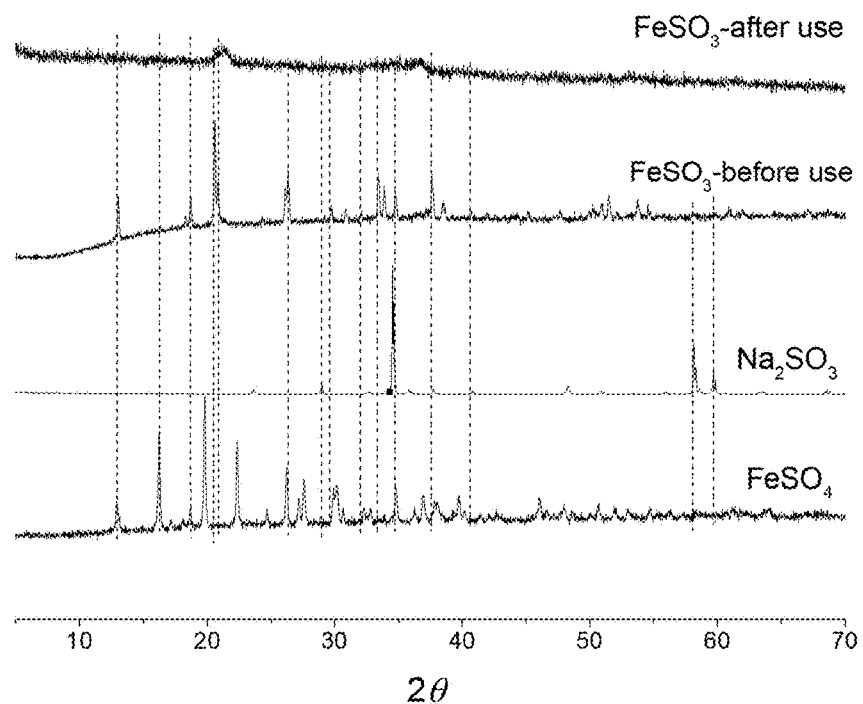
FIG. 2 shows X-Ray Diffraction analysis for $FeSO_4$, $Na_2SO_3$, and the ferrous sulfite catalyst before and after use in degradation.
Figure 3:
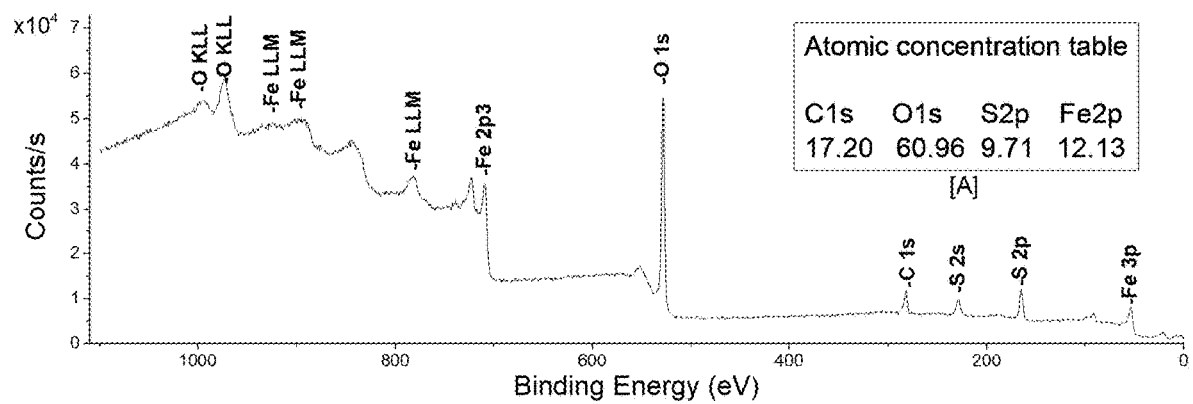
FIG. 3 shows X-ray photoelectron spectroscopy of the ferrous sulfite catalyst.
Figure 4:
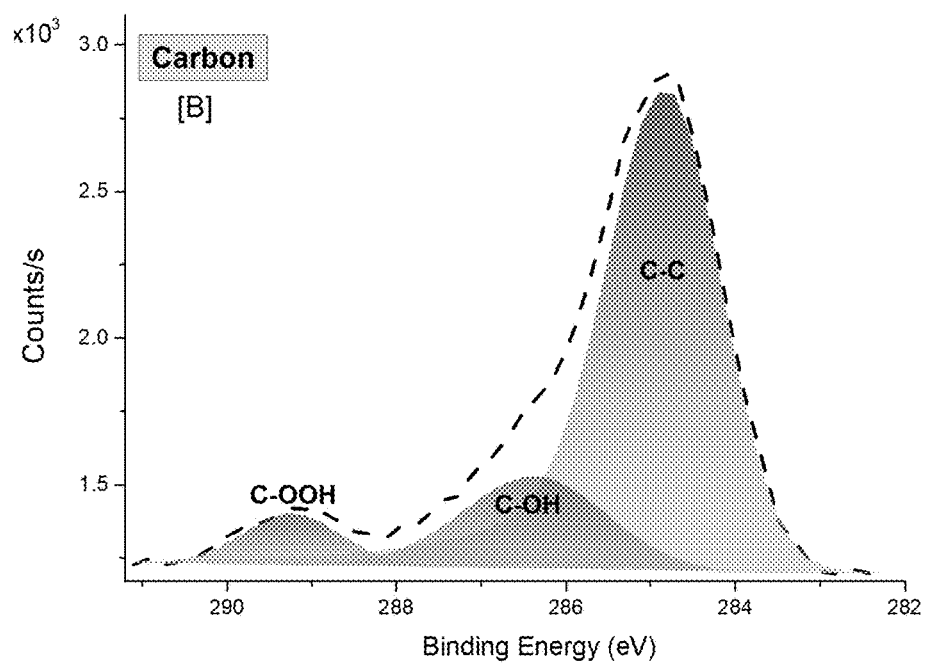
FIG. 4 shows X-ray photoelectron spectroscopy of the ferrous sulfite catalyst pertaining to carbon.

Results of XRD analysis, shown in FIG. 2, revealed the characteristic Fe diffraction peak (in $FeSO_4$ substrate) centered at 2θ=19 was shifted and split into two peaks at 2θ=20 due to the formation of The ferrous sulfite catalyst, while the peaks at 2θ=59 and 60 corresponding to $SO_3^{2-}$ (in $Na_2SO_3$ substrate) disappeared from the ferrous sulfite catalyst XRD. Thus, the formation of a new crystal phase of the ferrous sulfite catalyst was confirmed. The disappearance of several Fe characteristic peaks in unused the ferrous sulfite catalyst from the XRD of used the ferrous sulfite catalyst suggested the dissolution of iron during the degradation process.

Figure 5:
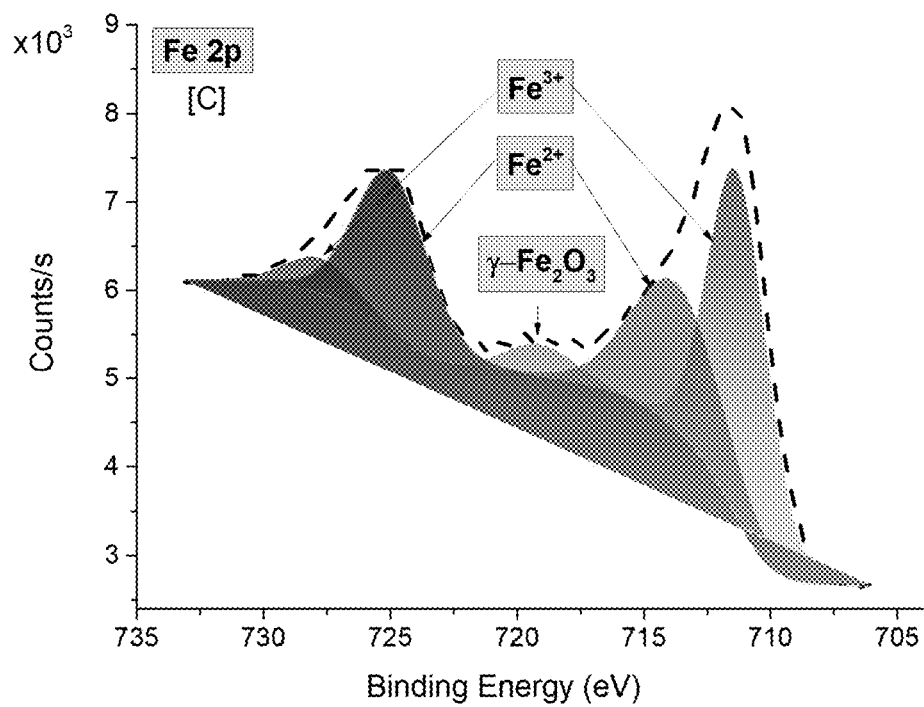
FIG. 5 shows X-ray photoelectron spectroscopy of the ferrous sulfite catalyst pertaining to iron.
Figure 6:
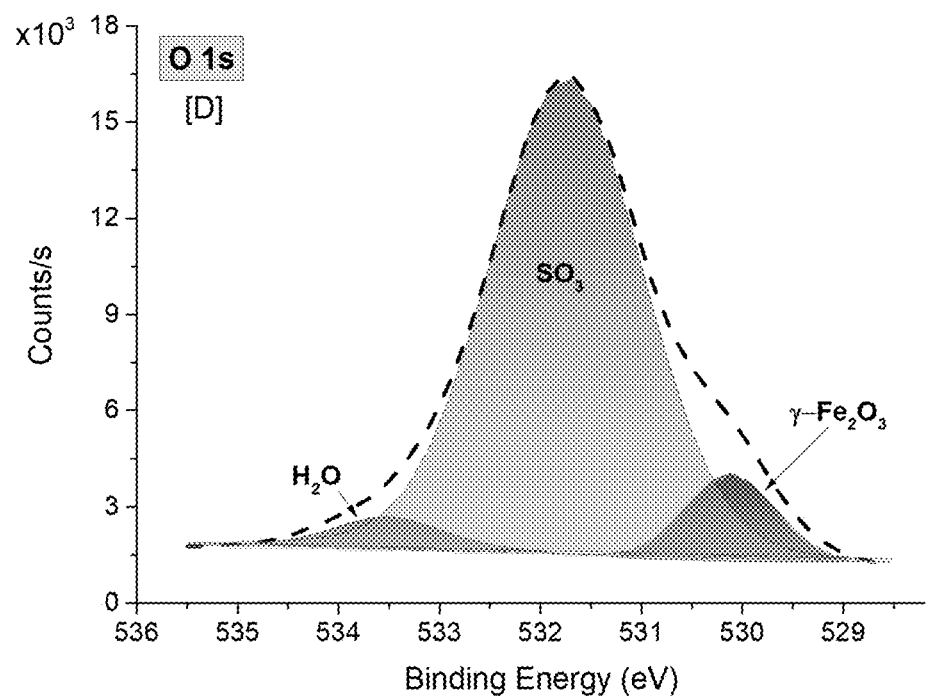
FIG. 6 shows X-ray photoelectron spectroscopy of the ferrous sulfite catalyst pertaining to oxygen.
Figure 7:
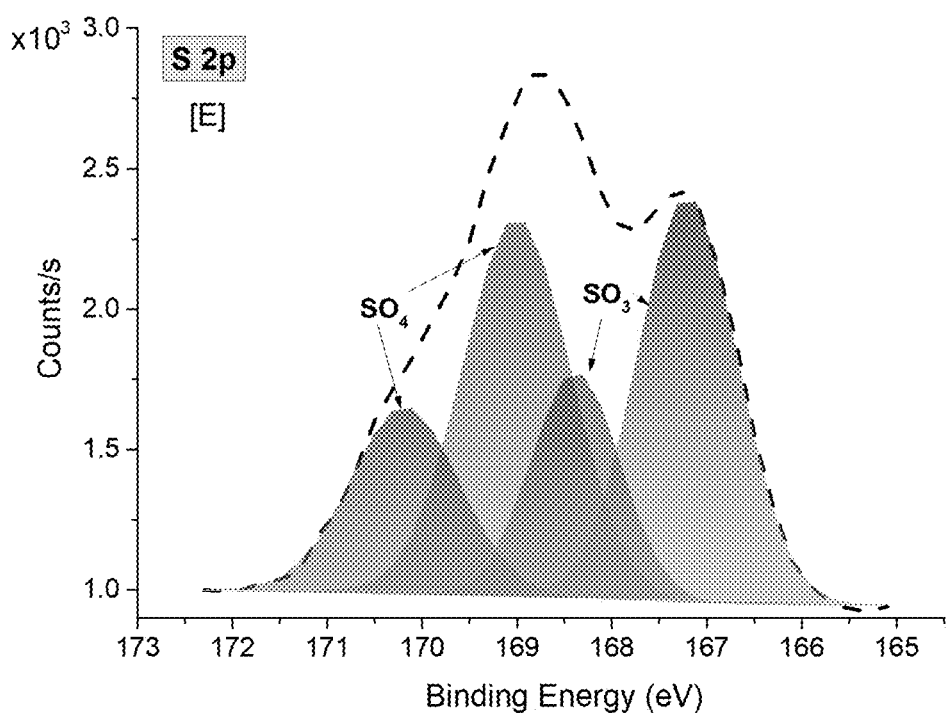
FIG. 7 shows X-ray photoelectron spectroscopy of the ferrous sulfite catalyst pertaining to sulfur.

XPS analysis revealed C, Fe, S and O are the major elemental components of the ferrous sulfite catalyst, as seen in FIGS. 3-7. Without intending to be bound by any particular theory, it is believed that carbon may be introduced as an impurity from the atmosphere during either synthesis or characterization of the ferrous sulfite catalyst. The iron component existed in two forms, as shown in FIG. 5, i.e., $Fe^{2+}$ (2p peaks 711.2 and 724.9 eV) and $Fe^{3+}$ (2p peaks 713.7 and 727.7 eV), in addition to the satellite peak at 719.0 eV that was assigned to surface oxidized iron (i.e., $\gamma$-$Fe_2O_3$). There were three different oxygen chemical environments, as shown in FIG. 6, i.e., the peaks at 530.1 eV corresponding to $Fe_2O_3$ oxygen, 531.7 eV assigned to sulfite oxygen, and 533.5 eV likely corresponding to $H_2O$. As shown in FIG. 7, sulfur was mainly present in the form of sulfite ($SO_3$; i.e., the peaks at 167.2 and 168.4 eV) and sulfate ($SO_4$; i.e., the peaks at 169.0 and 170.2 eV).

Degradation of a Single PFAS

Figure 8:
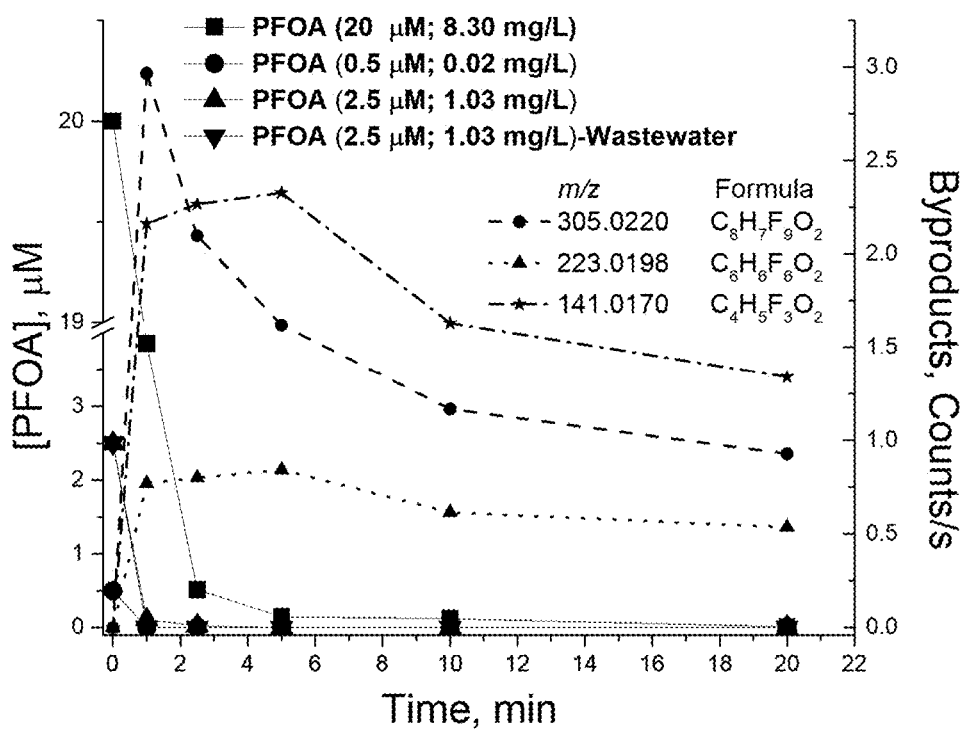
FIG. 8 shows a chromatogram of concentration of perfluoro-n-octanoic acid over time.
Figure 9:
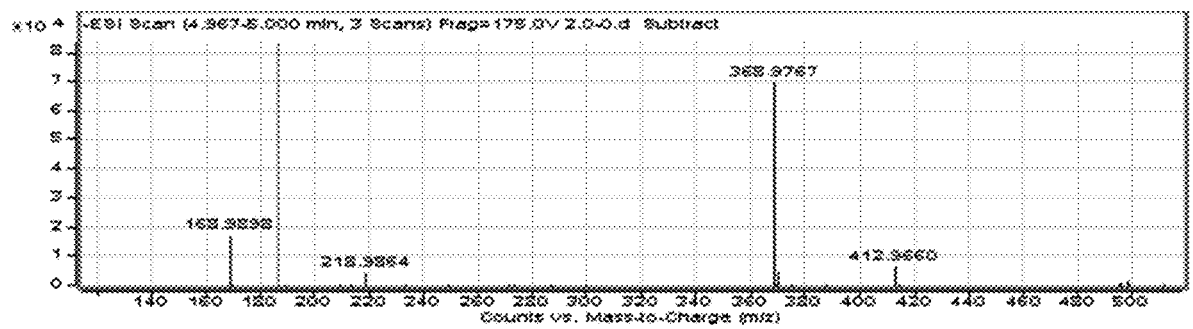
FIG. 9 shows mass spectroscopy data for perfluoro-n-octanoic acid.
Figure 10:
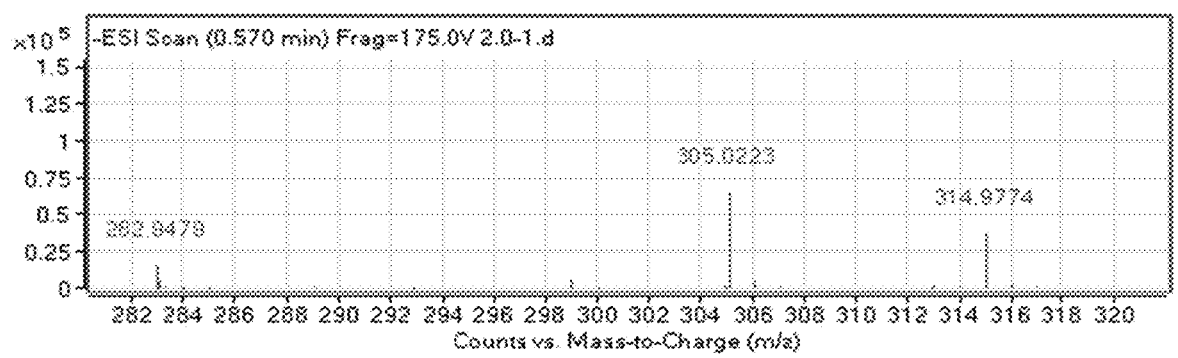
FIG. 10 shows mass spectroscopy data for 2,3,4,5,6,7,8,8,8-nonafluorooctanoic acid.
Figure 11:
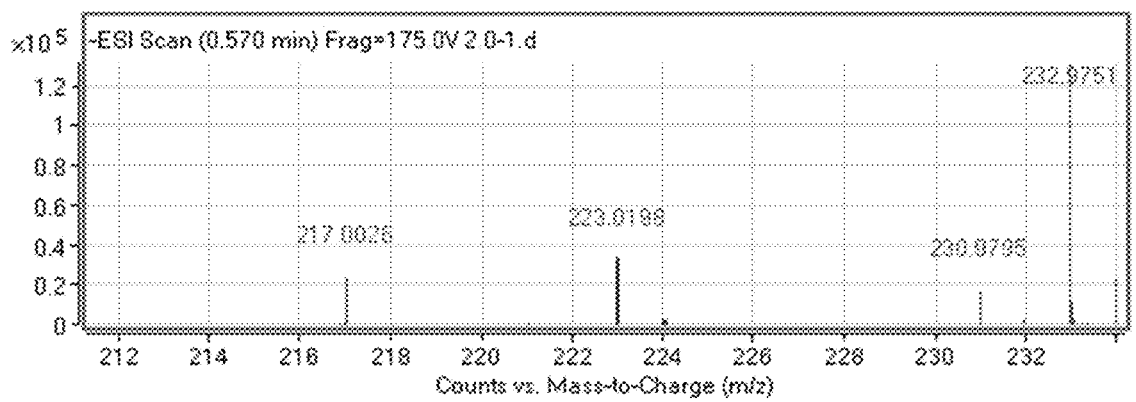
FIG. 11 shows mass spectroscopy data for 2,3,4,5,6,6-hexafluorohexanoic acid.
Figure 12:
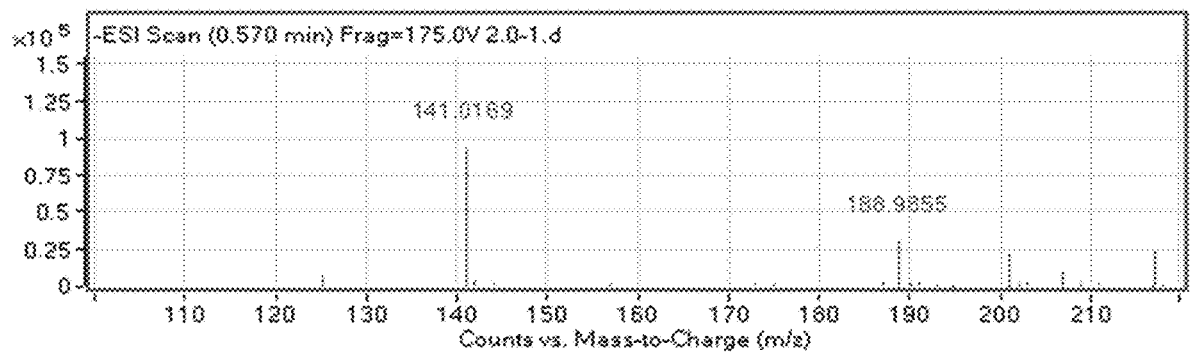
FIG. 12 shows mass spectroscopy data for 2,3,4-trifluorobutanic acid.

Preliminary degradation of two initial perfluorooctanoic acid (compound (1), PFOA) concentrations by 0.5 g/l ferrous sulfite catalyst were conducted in 20 ml Milli-Q water under uncontrolled pH and dark experimental conditions without any added external oxidants. Sampling of 300 μl was performed at 0, 1, 2.5, 5, 10 and 20 min. The concentrations of PFOA and its transformation byproducts at different reaction times were determined by LC/Q-TOF-ESI-MS and peak areas of corresponding chromatograms were plotted vs. time in FIG. 8. The ferrous sulfite catalyst showed an excellent ability to completely remove initial 2.5 μM (equivalent to 1.03 mg/l) and 25 μM (equivalent to 8.3 mg/l) PFOA in 1 and 5 min, respectively. The ferrous sulfite catalyst showed a similar removal efficiency for 2.5 μM initial PFOA in a biologically treated wastewater sample collected from the Metropolitan Sewer District of Greater Cincinnati, (Cincinnati, Ohio), as shown in FIG. 8, in which the two trend lines of 2.5 μM PFOA degradation in Milli-Q water and in wastewater overlap one another.

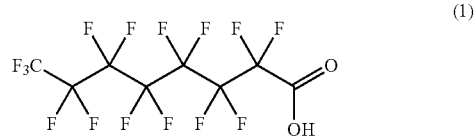 [SMILES: O=C(O)C(F)(F)C(F)(F)C(F)(F)C(F)(F)C(F)(F)C(F)(F)C(F)(F)F]

(1)

Three byproducts were identified during the experiments, namely 2,3,4,5,6,7,8,8,8-nonafluorooctanoic acid (compound (2), m/z=305.0220), 2,3,4,5,6,6-hexafluorohexanoic acid (compound (3), m/z=223.198), and 2,3,4-trifluorobutanoic acid (compound (4), m/z=141.0170), as shown in FIGS. 9-12. In terms of peak area, the compound (2) was rapidly evolved in the solution and peaked at 2 min, then declined gradually with time to almost 30% of its maximum detected concentration at 20 min. The formation of compound (2) may be rationalized by direct chemical reduction/de-fluorination of PFOA (i.e., loss of six F$^-$) by electrons generated from the ferrous sulfite catalyst. Compound (2) was then expected to undergo oxidative degradation by free radical species (i.e., advanced oxidation process; AOP) generated from the interaction between the transformed species from the ferrous sulfite catalyst.

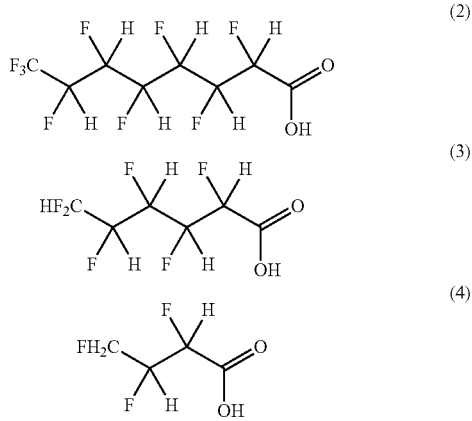

Without intending to be bound by any particular theory, it is believed that compound (2) may have more affinity to oxidation than compound (1), PFOA, due to the presence of carbon atoms that can be easily oxidized because of the pendant α-hydrogen atoms. Further reduction/oxidation of compound (2) was confirmed by the formation of compounds (3) and (4) in the solution. Through consecutive reduction (i.e., removal of three F$^-$) and oxidation (i.e., loss of "C$_2$H") of compound (2), compound (3) was formed. In a similar way, successive reduction and oxidation of compound (3) resulted in loss of "C$_2$HF$_3$" and generation of compound (4).

Degradation of a Mixture of PFAS

Figure 13:
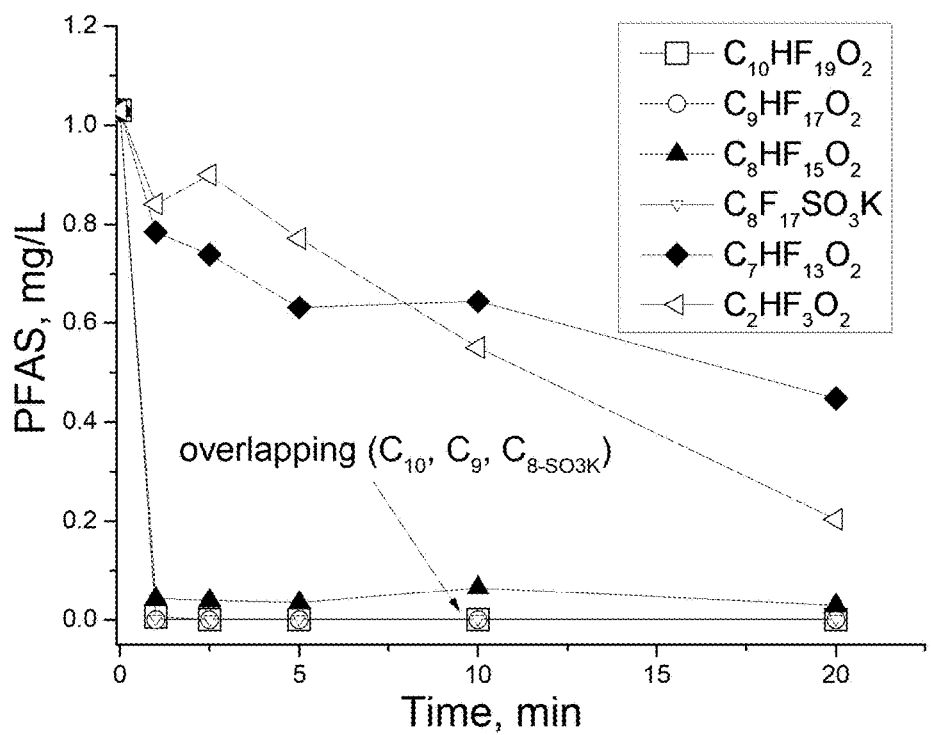
FIG. 13 a chromatogram of concentration of a mixture of PFAS over time.

Simultaneous degradation of a mixture of six PFAS (i.e., C$_2$HF$_3$O$_2$, C$_7$HF$_{13}$O$_2$, C$_8$HF$_{15}$O$_2$, C$_8$HF$_{17}$SO$_3$K, C$_9$HF$_{17}$O$_2$, and C$_{10}$HF$_{19}$O$_2$) was performed in the presence of 1.0 g/l ferrous sulfite catalyst in 20 ml Milli-Q water without pH adjustment. FIG. 13 shows the degradation profiles for the different PFAS during the 20 min reaction time. All tested PFAS were degraded but exhibited differing degradation kinetics. The C$_2$ and C$_7$ PFAS were degraded more slowly than the remaining compounds. The remaining compounds, i.e., the C$_8$, C$_9$, and C$_{10}$ PFAS exhibited relatively fast degradation, with almost complete removal in the first minute of the degradation reaction. This result suggested PFAS with shorter carbon skeletons have less susceptibility towards adsorption and further reduction at the ferrous sulfite catalyst than those with longer carbon chains.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A composition comprising
   an aqueous solution comprising at least one fluorinated organic compound; and
   a reaction product of a source of iron(II) and a source of sulfite in the presence of water and molecular hydrogen.
2. The composition of claim 1, wherein the reaction product is present in a concentration of from 0.25 g/l to 1 g/l.
3. The composition of claim 1, wherein the reaction product is present in a concentration of from 0.4 g/l to 0.6 g/l.
4. The composition of claim 1, wherein the at least one fluorinated organic compound is selected from the group consisting of perfluoro-n-butanoic acid, perfluoro-n-pentanoic acid, perfluoro-n-hexanoic acid, perfluoro-n-heptanoic acid, perfluoro-n-octanoic acid, perfluoro-n-nonanoic acid, perfluoro-n-decanoic acid, perfluoro-n-undecanoic acid, perfluoro-n-dodecanoic acid, perfluoro-n-tridecanoic acid, perfluoro-n-tetradecanoic acid, perfluoro-n-hexadecanoic acid, perfluoro-n-octadecanoic acid, potassium perfluoro-1-butanesulfonate, sodium perfluoro-1-hexanesulfonate, sodium perfluoro-1-octanesulfonate, sodium perfluoro-1-decanesulfonate, and combinations of two or more thereof.
5. The composition of claim 1, wherein the at least one fluorinated organic compound comprises perfluoro-n-octanoic acid.
6. The composition of claim 1, wherein the source of sulfite comprises sodium sulfite, the source of iron(II) comprises iron(II)sulfate heptahydrate, and the reaction product comprises ferrous sulfite.
7. The composition of claim 1, wherein the reaction product is a catalyst, the catalyst being immobilized on a solid support.
8. The composition of claim 7, wherein the solid support is selected from the group consisting of granulated activated carbon, a porous ceramic material, a porous carbon sheet, and a combination thereof.
9. A method for degrading fluorinated organic chemicals in aqueous media, the method comprising:
   contacting the fluorinated organic chemicals with a reaction product of a source of iron(II) and a source of sulfite in the presence of water and molecular hydrogen.
10. The method of claim 9, wherein the reaction product is present in a concentration of from 0.25 g/l to 1 g/l.
11. The method of claim 9, wherein the reaction product is present in a concentration of from 0.4 g/l to 0.6 g/l.
12. The method of claim 9, wherein the fluorinated organic chemicals are selected from the group consisting of perfluoro-n-butanoic acid, perfluoro-n-pentanoic acid, perfluoro-n-hexanoic acid, perfluoro-n-heptanoic acid, perfluoro-n-octanoic acid, perfluoro-n-nonanoic acid, perfluoro-n-decanoic acid, perfluoro-n-undecanoic acid, perfluoro-n-dodecanoic acid, perfluoro-n-tridecanoic acid, perfluoro-n-tetradecanoic acid, perfluoro-n-hexadecanoic acid, perfluoro-n-octadecanoic acid, potassium perfluoro-1-butanesulfonate, sodium perfluoro-1-hexanesulfonate, sodium perfluoro-1-octanesulfonate, sodium perfluoro-1-decanesulfonate, and combinations of two or more thereof.
13. The method of claim 9, wherein the fluorinated organic chemicals comprise perfluoro-n-octanoic acid.

14. The method of claim 9, wherein the source of sulfite comprises sodium sulfite, the source of iron(II) comprises iron(II)sulfate heptahydrate, and the reaction product comprises ferrous sulfite.

15. The method of claim 9, wherein the reaction product is a catalyst, the catalyst being immobilized on a solid support.

16. The method of claim 15, wherein the solid support is selected from the group consisting of granulated activated carbon, a porous ceramic material, a porous carbon sheet, and a combination thereof.

\* \* \* \* \*